United States Patent [19]
Wentworth et al.

[11] Patent Number: 4,903,309
[45] Date of Patent: Feb. 20, 1990

[54] FIELD PROGRAMMABLE AIDED TARGET RECOGNIZER TRAINER

[75] Inventors: Edwin W. Wentworth; William C. Gercken, both of Woodbridge; Stuart B. Horn; John H. Buchbach, both of Fairfax, all of Va.

[73] Assignee: The United States of America as represented by the Secretary of the Army, Washington, D.C.

[21] Appl. No.: 198,799

[22] Filed: May 25, 1988

[51] Int. Cl.$^4$ .......................... G06K 9/00; H04N 5/33
[52] U.S. Cl. ........................................... 382/1; 342/90; 342/176; 358/113
[58] Field of Search ............... 382/1, 34, 90; 342/190, 342/191; 358/113, 126

[56] References Cited
U.S. PATENT DOCUMENTS

| | | | |
|---|---|---|---|
| 3,261,014 | 7/1966 | Diaz | 358/113 |
| 3,636,513 | 1/1972 | Tisdale | 382/36 |
| 4,034,401 | 7/1977 | Mann | 358/113 |
| 4,497,065 | 1/1985 | Tisdale et al. | 382/1 |
| 4,639,774 | 1/1987 | Fried | 358/113 |

Primary Examiner—Leo H. Boudreau
Assistant Examiner—Daniel Santos
Attorney, Agent, or Firm—Milton W. Lee; John E. Holford; Anthony T. Lane

[57] ABSTRACT

The invention provides adaptive modules which combine with an aided target recognizer ATR to program or reprogram its circuitry while detecting existing targets. The signatures thus derived are more likely to produce accurate target classifications than the mathematically derived algorithms currently used. To insure accuracy during this programming a human observer is included in the network loops provided by the modules and provided with overriding decision capability.

5 Claims, 1 Drawing Sheet

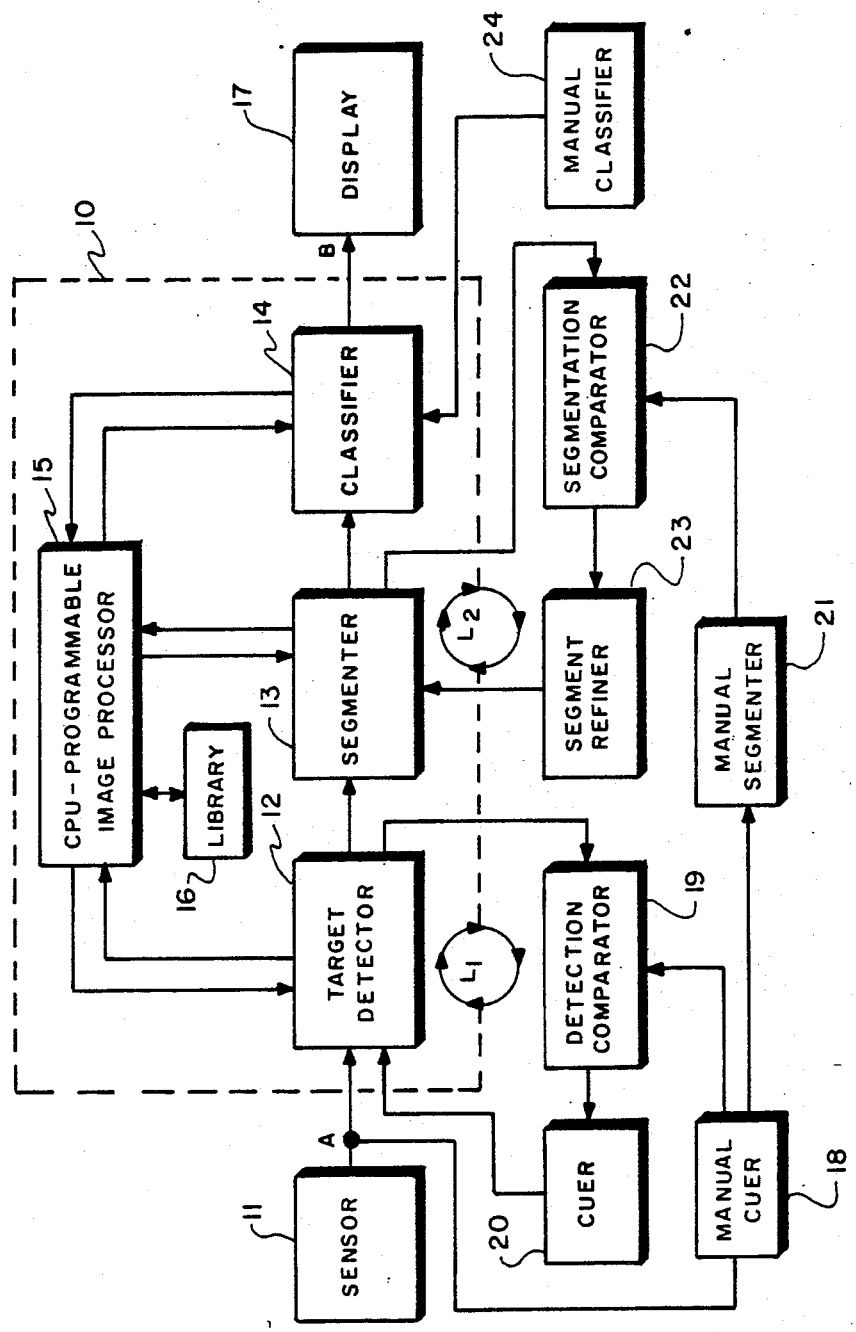

FIELD PROGRAMMABLE AIDED TARGET RECOGNIZER TRAINER

FIELD PROGRAMMABLE AIDED TARGET RECOGNIZER TRAINER

The invention described herein may be manufactured, used, and licensed by the U.S. Government for governmental purposes without the payment of any royalties thereon.

BACKGROUND

Field

The invention relates to aided (or automatic) target recognition systems (ATR's) using detectors such as LIDAR, RADAR, SONAR and passive forms of such detectors, i.e. FLIR's Image Intensifiers and radio telescopes. Currently these systems can reliably detect and identify virtually any type of target that could pose a threat in a military scenario. Their successful operation at present, however, requires an interaction with a human observer. Automatic forms of the above systems, inherently, provide faster and more reliable responses to threats than humans when properly programmed.

Prior Art

As indicated in applicants prior U.S. patent application Ser. No. 095,784, filed 14 Sept. 1987 and assigned to the same assignee as the present application, the best approach to an ATR is to use several different types of sensors and assign each sensor to those targets it can best identify. Considering the number of possible targets, the threat that each represents, and the combinations of climates and backgrounds against which they must be identified; assigning priorities in multisensor ATR's presents a formidable task. An object of the present invention is to provide much needed techniques and tools for accomplishing this task.

SUMMARY OF THE INVENTION

The invention provides a number of modules which connect to various circuits in an automatic or aided target recognition system (ATR). The modules allow a human technician to examine the detection process, the classification process and the sensor input data segments against which the memorized target signatures are correlated. The technician can thus replace inadequate signatures; and add new signatures; while observing their effect on the classification process. Since the signatures result from interactions between the actual targets and the sensor circuitry they are more realistic than the mathematically generated signatures usually employed.

BRIEF DESCRIPTION OF THE DRAWING

The drawing shows a block diagram of an ATR combined with a specific sensor, a display and the added modules of the present invention.

DESCRIPTION OF THE PREFERRED EMBODIMENT

As shown in the drawing the invention employs an aided target recognition system (ATR) 10 having an input A and an output B providing a video output. The video output includes a framed area denoting the scope of a target and a curser to denote a point on the screen. Video is supplied by a sensor connected to input A. The sensor may be a Forward Looking Infrared Imager (FLIR) LIDAR, RADAR, SONAR, a TV camera, a TV receiver or a video tape player (VCR). All of these sensors have been developed in forms which provide a TV type video output signal from which a visible image can be reconstructed. The output from the sensor is connected to the input of the ATR 10 and this signal passes serially through a detector 12, a segmenter 13 and a Classifier 13. The detector removes the carrier signal, if present, and separates from the video luminance signal all auxiliary signals, such as line, field or chroma signals. For the purpose of describing the present invention the sensor is considered to be a FLIR. In an actual system there may be many sensors which can be switched in one at a time. In such systems the ATR is furnished information on the range and the type of sensor used along with time of day, weather, terrain and, if feasible, a limited range of target signatures to be considered.

Detector 12 contains fairly sophisticated logic for the purpose of selecting likely targets, but there are always certain extreme conditions where non-targets appear to be targets and vice-versa. To correct this the present invention provides that a human operator be involved by creating a decision loop $L_1$. The loop includes the detector 12, a detector comparator 19 and a cuer 20 which cues the target detector to the coordinates specified by the comparator. The operator controls a manual cuer 18 which includes a mouse or joystick, synchronized with the sensor input signal. Only when the detector and operator select substantially the same coordinates does the cuer 20 cause the detector to provess the video signal corresponding to the target. Processing involves storing the targets signature as perceived by the detector and confirming proper storage by redetecting the target from that signature.

The above storage process is performed by the Programmable Image Processor (PIP). The PIP is a Central Processing Unit (CPU) that controls the storage and retreival of the signatures used in different parts of the ATR. It stores them in a memory library 16. The PIP is preprogrammed to access only that part of a library corresponding to a particular sensor, time of day and other data which basically affect all target signatures equally. The PIP performs similar functions for the segmenter and Classifier.

The segmenter 13 further processes the detection features to develop a silhouette or template by extracting bright spots and edges. The segments are tested by loop $L_2$. A gain a comparator interrupts the segmentation process just prior to storage. At this time the template or segmentation is displayed adjacent the video image on the display. Using the same mouse or joystick the cursor can be placed on any part of the image not properly segmented. Pressing a button on the manual segmenter then cues the Segmentation Comparator to conform or reject the template. The template is then reprocessed through the Segment Refiner to improve any rejected templates. This normally prevents a common error where a single target is resolved into two or more templates. The algorithm developed in this way by the segmenter best describes the target for the Classifier.

Given the proper template the function of the Classifier is straight forward. It labels the target as a given type with a certain priority as assigned by the PIP and provides an appropriate output response through outlet B and other outlets (not shown) to which automatic systems may be coupled. The responses are also displayed in printed form on the display 17. The Manual Classifier 24 which can be a CPU keyboard or some simpler device is used to change any incorrect data generated by Classifer 14.

All of the blocks shown in the drawing are off-the-shelf items. The advantage of the present system lies the flexibility of the loop structures to provide ATR processed algorithms that define the targets. Previous attempts to define generalized permanent algorithms to cover all types of target encounters have proved futile. The approach here is to generate algorithms from the most current target data. This data can be programmed in as the automatic system approaches the target or it can be recorded and/or be transmitted instantaneously from reconnaissance aircraft. Since the algorithms are designed by the same circuitry that detects the targets, the likelihood of missed detections or false alarms is very small.

I claim:

1. In an ATR having a target detector, a segmenter, and a Classifier; the improvement comprising:
   a display means connected to said ATR to permit a human operator to view and understand the sequential operations performed by the ATR; and
   a loop circuit cueing means coupling the output of said detector to the input thereof to permit said operator to cue targets and to circulate detected targets until the detector has stored and thereby recognizes only these targets cued by said operator.

2. In an ATR having a target detector, a segmenter, and a Classifier; the improvement comprising:
   a display means connected to said ATR to permit a human operator to view and understand the sequential operations performed by the ATR; and
   a loop circuit cueing means coupling the output of said segmenter to the input thereof to permit said operator to cue segments and circulate segmented templates until said segmenter has stored only those templates cured by said operator.

3. An ATR according to claim 1 further including:
   a manual input means coupled to said Classifier to permit a human operator to reprogram the labeling process of said Classifier.

4. An ATR according to claim 1 further including:
   a loop circuit cueing means coupling the output of said segmenter to the input thereof to permit said operator to cue segments and circulate segmented templates until said segmenter has stored only those templates cued by said operator.

5. An ATR according to claim 3 further including:
   a loop circuit cueing means coupling the output of said segmenter to the input thereof to permit said operator to cue segments and circulate segmented templates until said segmenter has stored only those templates cured by said operator.

* * * * *